United States Patent [19]

Rothchild

[11] 4,424,680

[45] Jan. 10, 1984

[54] INEXPENSIVE METHOD OF RECOVERING CONDENSABLE VAPORS WITH A LIQUIFIED INERT GAS

[76] Inventor: Ronald D. Rothchild, 106 Rynda Rd., South Orange, N.J. 07079

[21] Appl. No.: 319,329

[22] Filed: Nov. 9, 1981

[51] Int. Cl.³ ............................................. F17C 11/00
[52] U.S. Cl. ......................................... 62/48; 62/11; 62/54
[58] Field of Search ........................ 62/8, 11, 48, 54; 34/28, 32

[56] References Cited

U.S. PATENT DOCUMENTS

| | | | |
|---|---|---|---|
| 3,707,066 | 12/1972 | Carne et al. | 62/11 |
| 4,122,684 | 10/1978 | Clarkson et al. | 62/54 |
| 4,133,663 | 1/1979 | Skinner | 62/23 |
| 4,150,494 | 4/1979 | Rothchild | 34/28 |

*Primary Examiner*—Ronald C. Capossela
*Attorney, Agent, or Firm*—Hopgood, Calimafde, Kalil, Blaustein & Judlowe

[57] ABSTRACT

Method and apparatus for recovering, as liquid, condensable vapor contained in a gas stream by refrigerating the gas stream by injecting the liquified phase of an inert gas, such as nitrogen, mixing the combined gas stream and liquified inert has, and separating the condensed condensable vapor from the remaining gas stream and inert gas.

11 Claims, 2 Drawing Figures

U.S. Patent   Jan. 10, 1984   4,424,680
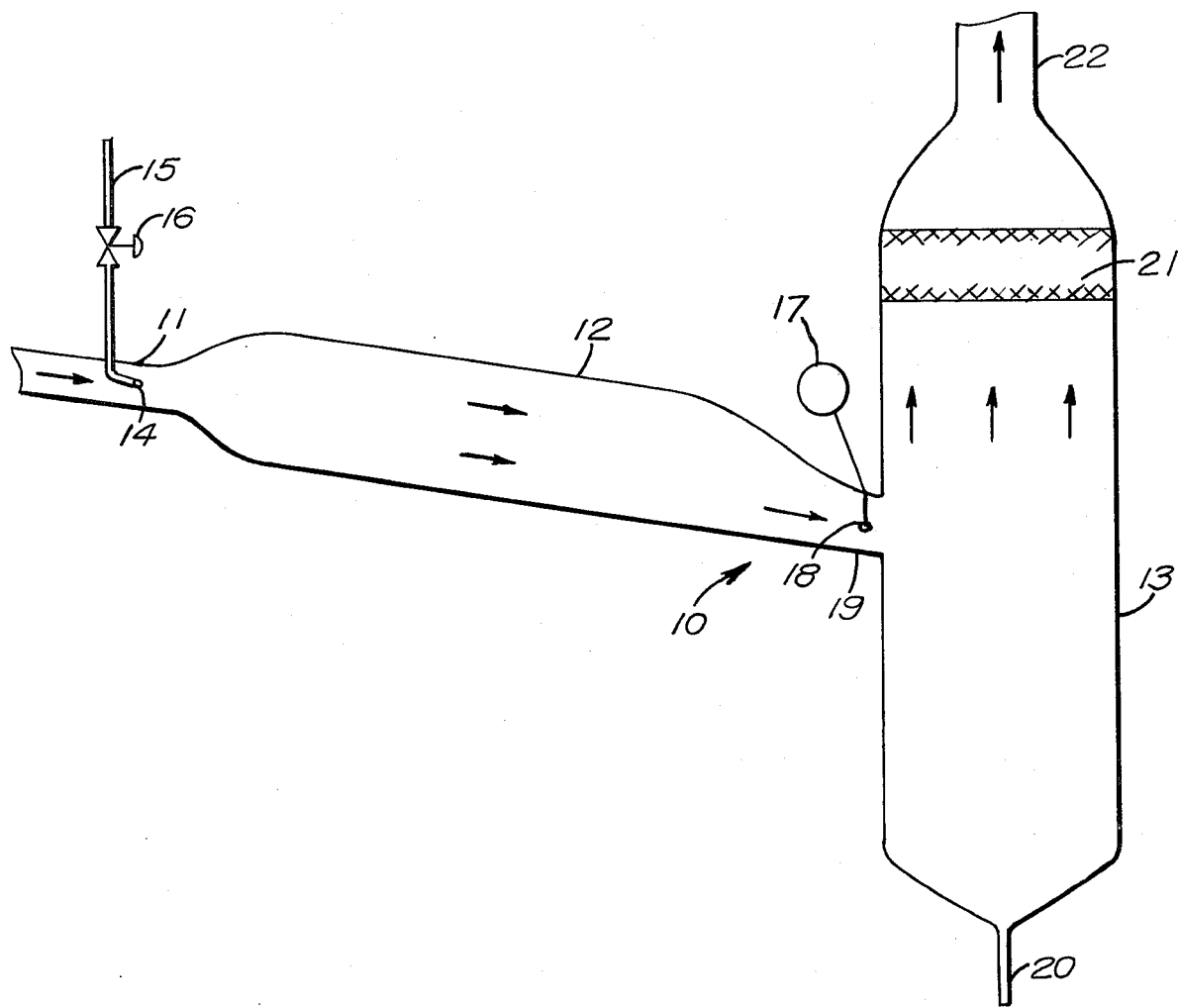

4,424,680

INEXPENSIVE METHOD OF RECOVERING CONDENSABLE VAPORS WITH A LIQUIFIED INERT GAS

BACKGROUND OF THE INVENTION

The present invention relates to a method of condensing vapors, using an inert gas in its liquid phase as an expendable refrigerant by injecting the liquified gas directly into the gas stream containing the vapors to be condensed.

There are numerous industrial processes that emit condensable vapors or gases, the economical recovery of which would be desirable as the vapors represent a source of pollution as well as a valuable resource being lost. Such processes include, for example, the industrial drying of paints, inks and adhesives, as well as the sterilizing of sanitary components and certain foodstuffs in gas filled autoclaves, and even the storage of volatile liquids in large tanks which must be vented for safety.

In some cases a substantial portion of the vapors may be condensed and recovered by heat exchange with ordinary chilled water. Very often, however, the vapors are too diluted or the materials too volatile for condensation at the temperature of cooling water to be effective. In such cases, cooling water must be replaced or augmented by more intense refrigeration.

Mechanical refrigeration of exhaust gases has been used in the recovery of solvents from, for example, paint ovens. However, mechanical refrigeration systems for this purpose, scaled to industrial needs, are large and very expensive and energy intensive. The disadvantages of mechanical refrigeration systems are compounded where the materials to be recovered are extremely volatile. In practice, such systems are limited to condensation temperatures of about $-20°$ F. or higher. This may be adequate to condense a vapor such as toluene in some applications, for example, but not cold enough for substantial condensation of methyl-ethyl-ketone or ethylene oxide, which could require condensation temperatures of about $-60°$ F. and $-140°$ F. respectively.

U.S. Pat. No. 4,150,494 describes a system using liquid nitrogen refrigeration to condense and recover solvents vaporized in cure ovens. Liquid nitrogen, with a normal boiling point of about $-320°$ F., has ample refrigerating capability for recovery of most common solvents and process gases. However, it is so cold that its use as a refrigerant is difficult to control. Most solvents will freeze, rather than condense, upon contact with liquid nitrogen. The patent does not describe the manner in which heat exchange with liquid nitrogen is to be accomplished, but stipulates that it should be performed so as not to freeze the solvents.

The system described in U.S. Pat. No. 4,150,494 is now in commercial use. Its final stage of refrigeration, utilizing liquid nitrogen, is a packed column with a reservoir at its bottom for storage of liquid solvent, and a recirculation of chilled liquid solvent through the packing. Liquid nitrogen is poured directly into the solvent reservoir to cool it, and the device relies on the agitation of a recirculation pump and of boiling nitrogen to prevent freezing and maintain a controllable average temperature in the reservoir. The column is only marginally stable and is subject to the entire solvent reservoir freezing solid in the unpredictable industrial environment, in which case the entire system is unusable for several hours while the solvent melts. The column also needs to be primed with a large quantity of liquid solvent before it can be used, which makes it inconvenient or unsuitable in many cases. U.S. Pat. No. 4,133,663 described a system using liquid nitrogen for condensation of vinyl chloride by simple heat exchange. However, vinyl chloride has a very low freezing point, about $-245°$ F., not much above the boiling point of liquid nitrogen, particularly if the nitrogen is pressurized, and has therefore less tendency to freeze during momentary lapses of flow or control. The system is not suitable for condensing the numerous materials with much higher freezing points.

U.S. Pat. No. 4,122,684 describes a two-stage heat exchanger in which an intermediate fluid carries heat from the condensing vapor to the liquid nitrogen. The intermediate fluid is boiled by the vapor stream and condensed by the nitrogen, and circulates between the two. The system is relatively stable against freezing, but is expensive.

Nitrogen gas has also been used as an intermediate fluid, in which case liquid nitrogen is sprayed into the nitrogen gas to chill it and the chilled gas circulates through a heat exchanger to condense the vapor. The chilled nitrogen may be circulated by a blower or by natural convection. Only one heat exchanger is required, as compared with two heat exchangers where the intermediate fluid is isolated from the liquid nitrogen as well as from the condensing vapor, but still the equipment is large and expensive.

It is an object of the present invention to provide a method of utilizing a liquified gas such as nitrogen to condense process vapors without the size and high cost inherent in conventional heat exchangers.

It is a further object of the invention to provide a method of condensing vapors with liquid nitrogen which deters freezing of the vapors which are being condensed.

It is still a further object of the invention to provide a system for condensing vapors which is simple to construct and to operate, low in cost, and operable over a wide range of process conditions.

SUMMARY OF THE INVENTION

In accordance with one method of practicing the present invention, a flow of condensable vapor, which may be diluted with a relatively non-condensable gas, is passed through a first functional zone in which it is mixed with a fine spray of the liquid phase of an inert gas, through a second functional zone in which it resides for a period sufficient for the droplets of sprayed liquified gas to evaporate and for the combined flow to equilibrate to a substantially homogeneous temperature, and in which liquid droplets of the condensable vapor are formed and begin to separate from the gas flow, and through a third functional zone in which the condensed vapor is separated from the remaining combined gas flow. Depending on process conditions and the sensitivity to freezing of the vapor being condensed, the three zones may be combined into two, or even one, physical component such as a vessel or cyclone separator. Preferably, the partial pressure of condensable vapor in the gas stream entering the first zone is at least 6 mmHg, the equilibrated temperature of the combined flow leaving the second zone is above the freezing point of the condensable vapor, the spray of liquified inert gas, vapor, and non-condensable gas flowing in both the first two zones, are directed such that the flows are lower in temperature than the solid surfaces that define the boundaries of the zones, and the flow in both zones is turbulent. Upon its collection, the liquified vapor may be transferred to a storage facility or reused. The remaining gas flow, which leaves the third zone at the temperature at which the vapor was condensed, which may be as low as −250° F., may be vented directly or it may first be directed back to be used as a refrigerant, such as to pre-chill the gas flow entering the first zone. Thus, the method and apparatus according to the present invention enable the almost complete recovery of condensable vapors in a controllable fashion with simple, relatively inexpensive equipment.

BRIEF DESCRIPTION OF THE DRAWING

The invention will be more clearly understood by reference to the following description taken in conjunction with the sole FIGURE illustrating a preferred method of practicing the invention.

DETAILED DESCRIPTION

The method for condensing and recovering vapors in accordance with the present invention is premised upon the maintenance of a sufficiently high concentration of such vapors, in the gas stream from which they are to be condensed, so that the dewpoint of such vapors is substantially above their freezing point. For example, if the vapor to be condensed is vinyl chloride, with freezing point −245° F., then the dewpoint of vapor in the stream should be preferably above about −205° F. If the vapors are of ethylene oxide or methyl-ethyl-ketone with freezing points of −168° F. and −123° F., respectively, then the dewpoints of such vapors should preferably be maintained above about −125° F. and −80° F. respectively. This is not a severe requirement as the partial pressures of such vapors which correspond to such dewpoint temperatures are generally only about 1 mmHg or less.

The very low dewpoints and partial pressures required imply that the condensable vapor may be present in a very low concentration in a non-condensable carrier gas. For example, if the total pressure of the gas stream from which vapor is to be condensed is 1 atmosphere, or 760 mmHg, and the partial pressure of said condensable vapor is 1 mmHg, then the concentration of said condensable vapor in said gas stream is only about 0.13% by volume. Thus, the present invention will permit the recovery by condensation of a substantial portion of vapors, typically 70% or more, from a very diluted stream.

However, the chilling of a very diluted vapor in a gas stream to the extreme low temperature required for substantial vapor recovery, which is typically at least 20° F. below the dewpoint temperature of said vapor, and preferably 30° F. or more below the dewpoint of said vapor, will necessarily require that the non-condensable component which is the major portion of said gas stream is also chilled to said extreme low temperature. This may be an economic burden as most of the refrigeration provided to chill the gas stream is used to chill its noncondensable component rather than to condense the vapor. In consequence the consumption of the liquified inert gas which provides the refrigeration may be high relative to the amount of vapor being recovered, which may lead to a high operating cost for the condenser, or the gas stream may be pre-chilled before entering the condenser, such as by cold gas leaving the condenser in a recuperative heat exchanger, which increases the overall initial cost of the condensation equipment. Therefore, it is economically desirable that the concentration of vapor to be condensed be as high as is practical in the gas stream entering the condenser. For example, the condensable vapor may be ethylene oxide (ETO) with a dewpoint temperature of −130° F., which corresponds to a partial pressure of 1 mmHg, in a gas stream with total pressure of 1 atmosphere, and the major component of said gas stream may be nitrogen gas or air, with partial pressure 759 mmHg. The gas stream must be chilled to about −160° F. to recover about 70% of said ETO by condensation. If the gas stream is initially at 100° F. and is chilled entirely by the addition of liquid nitrogen, then about 370 lb. of liquid nitrogen must be used for each 1 lb. of ETO condensed, which is not economically attractive.

If the gas stream is pre-chilled, such as by recuperative heat exchange with gas leaving the condenser, to −150° F., then the amount of liquid nitrogen consumed for refrigeration is reduced to about 14 lb. for each 1 lb. of ETO recovered. However, the equipment required for said recuperative heat exchange may be costly.

If, on the other hand, the partial pressure of ETO in the gas stream entering the condenser is 100 mmHg, the remainder being nitrogen gas, then 70% of the ETO may be recovered using only about 5 lb. of liquid nitrogen for each 1 lb. of ETO recovered, without the need for any prechiller. Thus, it is advantageous to maintain a high condensable vapor concentration in the gas stream entering the condenser, for example with partial pressure of 5 mmHg or more if the total pressure is 1 atmosphere.

Upon entering the first of three functional zones, according to the present invention, said gas stream is preferably directed to flow through a first constricted conduit such as a venturi, wherein its velocity is increased to, for example, 100 ft/sec. or more. A fine spray of liquified inert gas, such as liquid nitrogen, is introduced to the gas stream in this zone. The purpose of the high velocity of said gas stream in this zone is to entrain the droplets of liquid nitrogen and sweep them away so that no substantial portion of the liquid nitrogen impinges upon the walls of the conduit, which would create local cold spots and freezing of the condensable vapor.

Said gas stream with entrained droplets of liquid nitrogen then enters a second functional zone, in which flow velocities may be lower than in the first zone, but in which the flow is preferably still turbulent. The purpose of this second zone is to provide a residence for mixing and temperature equilibration of the flow, such that all droplets of liquid nitrogen should have entirely vaporized by the time the flow leaves said second zone. The second zone may be, for example, a section of enlarged pipe following the constriction of the first zone.

The combination of a fine spray orifice with the pneumatic atomizing effect of releasing liquid nitrogen from a pressurized pipe into the relatively low pressure environment of the first zone typically results in the droplets of liquid nitrogen entrained in the gas stream having initial diameter about 40 microns. The temperature of said droplets is about −320° F. Residence time of the gas stream in the second functional zone should therefore be more than 1 second, and preferably about 5 seconds, to permit complete evaporation of the droplets in a gas that may vary from ambient temperature or greater to as low as about −230° F.

Droplets of condensed vapor form in the first and second zones as the gas stream approaches a low, homogeneous temperature, and these droplets may begin to coalesce and form a quantity of bulk liquid. The first and second zones should therefore be physically disposed such that a channel is provided for liquid to flow to a location where it can be collected and removed. Preferably, this is accomplished by orienting the first and second zones at an angle from the horizontal, with the lower internal surfaces of said first and second zones declining toward the third zone over their entire length. In this manner, any bulk liquid formed in said first and second zones as the result of vapor condensation will flow into said third functional zone, the specific purpose of which is the separation of said liquid from the remaining gas stream, and the collection of said liquid.

The gas stream preferably leaves the second zone through a second constricted conduit, to increase its velocity for its entrance to the third functional zone, which may preferably be a knock-out pot or cyclone separator. Liquid is collected at the bottom of this third zone for subsequent transfer out of the recovery system, and the remaining gas stream is allowed to flow out the top of said third zone. The outward flow of said remaining gas stream may be directed through a demister, to capture any droplets of condensed vapor remaining entrained in the gas stream.

The entire condensing apparatus should, of course, be insulated to minimize the flow of heat into said apparatus, and thereby minimize the consumption of the liquified inert gas used as a refrigerant.

The sole FIGURE illustrates an exemplary embodiment of apparatus for carrying out the method of vapor condensation according to the present invention. Apparatus 10 for condensing vapors from a gas stream includes a first functional zone 11, a second functional zone 12, and a third functional zone 13. The entering gas stream, including condensable vapors, passes through said first functional zone 11, which is a first narrow section of conduit, where it obtains a high velocity of, for example, 100 ft./sec., and where a spray of the liquified phase of an inert gas is sprayed into said gas stream through spray orifice 14.

Liquified inert gas which may comprise nitrogen, carbon, dioxide, argon, etc., is supplied through conduit 15. The flow of said liquified inert gas, through said conduit 15 and orifice 14 and into said first zone 11, may be regulated by valve 16. Said regulation may be automatic, with said valve 16 being controlled by a temperature controller 17, based on a signal derived from temperature sensor 18 which senses the temperature of the gas stream leaving the second functional zone 12. Said temperature of said gas stream upon leaving said second zone 12 is preferably controlled by the flow of the liquid phase of inert gas sprayed into first zone 11 through conduit 15 and orifice 14, as modulated by temperature sensor 18, controller 17, and valve 16, to be near, but above, the freezing point of condensable vapor in said gas stream.

Said gas stream flows from the first functional zone 11 through a second functional zone 12, where its flow is preferably turbulent, and its residence time is preferably 1 to 5 seconds. Said second functional zone 12 is preferably a widened section of conduit such that average velocity of the gas stream therein is, for example, 2 ft./sec., so that a 5 second residence time is achieved if said second zone 12 is 10 ft. long. The gas stream flowing through said second zone 12 is thoroughly mixed with the droplets of liquified inert gas introduced thereto in the first functional zone 11, the droplets of said liquified inert gas are vaporized, said gas stream becomes homogeneous in temperature, and the condensable vapor contained in said gas stream is condensed to a degree corresponding to its initial dewpoint and final temperature.

The gas stream leaving the second functional zone 12 is again accelerated through a second narrow section of conduit 19 so that its average velocity is, for example, 30 ft./sec., and its temperature is measured by sensor 18.

The gas stream leaving the second functional zone 12 through the narrow section of conduit 19 enters the third functional zone 13 which is, for example, a well known knock-out pot for the separation of droplets of liquified condensable vapor from the remaining gas stream, which at this point, includes the inert gas which was sprayed into the gas stream in liquified form in the first functional zone 11. Condensed vapor is removed from said third zone 13 through conduit 20. The remaining gas stream is preferably directed to flow upward, through a demister 21, the purpose of which is to remove any droplets of condensed vapor still suspended in said remaining gas stream, and out of the third zone 13 through conduit 22.

The entire apparatus 10 is preferably covered with thermal insulation, to minimize the consumption of liquified inert gas required for refrigerating the gas stream.

Various changes in form and detail may be made without departing from the spirit and scope of the present invention. Consequently, it is intended that the appended claims be interpreted as including all such changes and modifications.

I claim:

1. A method for recovering as liquid a condensable vapor comprising the steps of:
   a. introducing the liquid phase of an inert gas to a gas stream containing said condensable vapor;
   b. intermixing said gas stream and said liquified inert gas so that said liquified inert gas is vaporized and said gas stream becomes homogeneous in temperature, with the attendant condensation of said condensable vapor; and,
   c. separating said condensed condensable vapor from said gas stream and vaporized inert gas.

2. The method of claim 1 wherein said liquified inert gas is introduced as a fine spray.

3. The method of claim 1 wherein step b. comprises causing said gas stream and liquified inert gas to flow through a conduit with a residence time of 1 to 10 seconds.

4. The method of claim 3 wherein said flow in said conduit is turbulent.

5. The method of claim 1 wherein the introduction of said liquid phase of said inert gas in step a. is directed so that said liquid phase does not flow directly against any solid surfaces.

6. The method of claims 1, 2, 3, 4 or 5 wherein said homogeneous temperatures achieved in step b. is at least 30° F. below the dewpoint of said condensable vapor as it is introduced in step a., and at least 5° F. above the freezing point of said condensable vapor.

7. The method of claim 1 wherein said gas stream includes a non-condensable carrier gas intermixed with said condensable vapor.

8. Apparatus for recovering as liquid a condensable vapor comprising:

a. means for introducing the liquid phase of an inert gas to a gas stream containing said condensable vapor;

b. means for mixing said liquid phase of said inert gas with said gas stream to vaporize said liquid phase of said inert gas, condense a portion of said condensable vapor, and render said combined gas stream and vaporized inert gas substantially homogeneous in temperature; and, c. means for separating said condensed condensable vapor from said combined gas stream and vaporized inert gas.

9. Apparatus as defined in claim 8 wherein said means for mixing said gas stream with said liquified phase of said inert gas comprises a section of conduit scaled to the flow rate of said gas stream so that the flow of said gas stream is turbulent.

10. Apparatus as defined in claim 8 wherein said means for mixing said gas stream with said liquified phase of said inert gas comprises a section of conduit scaled to the flow rate of said gas stream so that the residence time of said gas stream in said section of conduit is 1 to 10 seconds.

11. Apparatus as defined in claims 8, 9 or 10 further comprising means for introducing said liquified phase of said inert gas at a regulated rate so that said homogeneous temperature is at least 30° F. below the dewpoint of said condensable vapor as it is introduced to said apparatus, and at least 5° F. above the freezing point of said condensable vapor.

* * * * *